United States Patent Office.

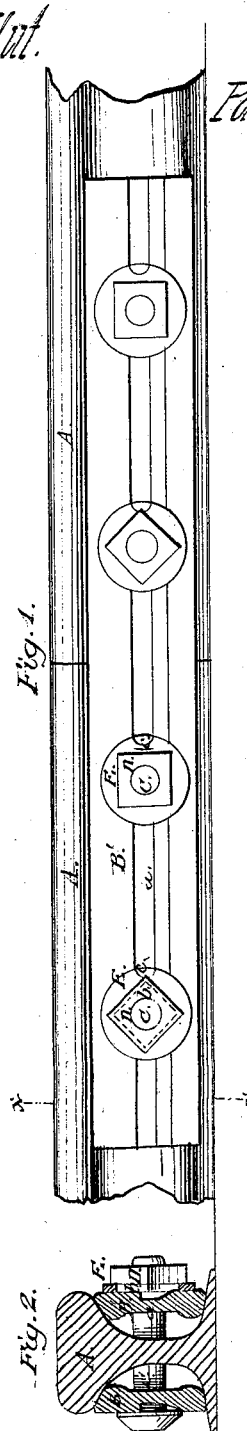

P. L. GIBBS, OF DUNLEITH, ILLINOIS.

Letters Patent No. 96,218, dated October 26, 1869.

IMPROVEMENT IN LOCK-NUT.

The Schedule referred to in these Letters Patent and making part of the same.

To all whom it may concern:

Be it known that I, P. L. GIBBS, of Dunleith, in the county of Jo Daviess, and State of Illinois, have invented a new and useful Improvement in "Railway-Bar Joints," or means for securing the same, of which the following is a full, clear, and exact description, reference being had to the accompanying drawing, forming part of this specification, and in which—

Figure 1 represents a side view of a fish-joint to two railway-bar lengths or sections, with my improvement applied thereto; and Figure 2, a transverse section of the same, mainly taken as indicated by the line $x\ x$, in fig. 1.

Similar letters of reference indicate corresponding parts.

My improvement relates to locking-nut arrangements or devices applicable to securing fish and other similar railroad-joints; and The invention consists in a certain combination, with recessed or grooved plates used to establish the joints, of nuts to the bolts that pass through said plate or plates and bar, formed with square or angular shoulders on their inside faces, and provided with washers of soft or malleable metal, constructed to fit the shoulders, so that on setting or bending the washers on their outside edges into the recesses or grooves in the plates, the nuts are locked, and prevented from working loose.

Referring to the accompanying drawing—

$a\ a$ represent two lengths or sections, in part, of a rail, arranged to fit end to end; and B B, outside plates or strips, used to secure the joint in the rail, by means of transverse bolts having nuts on their ends, and arranged to pass through the plates, and sections of rail lying in between them.

Both plates B B may be of similar construction, but reference need only be made here, in particular, to the one plate or strip B', which is suitably recessed, or formed with a longitudinal groove, $a$, on its outside, the lower shoulder of which may be bevelled downward, for purposes hereinafter explained.

C C are the transverse bolts used to secure the joint, and arranged to pass through both plates B B' and sections A A of the rail lying in between them.

D D are the nuts to the bolts C C.

These nuts are constructed with a square, angular rebate, $b$, on their inside face, on to which rebate of each nut a washer, E, is fitted, so that it can only turn with the nut.

In establishing the joint, the nuts D D are screwed up as usual on the bolts C C, and when tight, the edge or outer portion of the washers E "set" or bent, as at $c\ c$, so as to enter the groove $a$, on the under side of its upper edge, which prevents the nuts from turning or working loose.

To unscrew the nuts, for the purpose of taking out the bolts, a wedge or other device may be introduced between the inside face of the groove $a$ and set or bent portions $c\ c$ of the washers, and force applied to the wedge to straighten such bent portions, when the nuts may be unscrewed from the bolts.

As the set $c$ may be given to the washers at any point in their circumference, it is obvious that the nuts may be locked at varied tightening points or distances on the bolts. To facilitate tightening up the nuts, as wear or the lengthening of the bolts require, without prying up the washer or its set portion, the lower edge of the groove $a$ may be bevelled, or other like provision made for turning the nut in its tightening direction, so that when thus screwed up it may again be locked, by making a fresh "set" in its washer to underlap the upper edge of the groove.

What is here claimed, and desired to be secured by Letters Patent, is—

The nuts D, having a rebate around their inner face, in combination with the washer E, having an angular opening to fit said rebate, for operation in connection with the grooved plates B B', as shown and described.

P. L. GIBBS.

Witnesses:
W. A. RICHARDSON,
MARVIN STEWART.